United States Patent

[11] 3,596,701

| [72] | Inventor | Ermond G. Cowan<br>St. Petersburg, Fla. |
|---|---|---|
| [21] | Appl. No. | 857,085 |
| [22] | Filed | Sept. 11, 1969 |
| [45] | Patented | Aug. 3, 1971 |
| [73] | Assignee | Oravisual Company Inc.<br>St. Petersburg, Fla. |

[54] DISPLAY PANEL ASSEMBLY
9 Claims, 11 Drawing Figs.

[52] U.S. Cl. .................................................. 160/135,
160/229, 160/351
[51] Int. Cl. .................................................. A47g 5/00
[50] Field of Search........................................... 160/135,
229, 351; 40/152.1, 125, 125 E; 287/2, 127

[56] References Cited
UNITED STATES PATENTS

| 462,094 | 10/1891 | Fowler ......................... | 160/229 |
| 2,976,923 | 3/1961 | Hirashiki ...................... | 160/229 |
| 3,176,987 | 4/1965 | Johnston ...................... | 287/2 X |
| 3,204,689 | 9/1965 | Howell ......................... | 160/135 |
| 3,428,108 | 2/1969 | Singer ........................... | 160/135 |

Primary Examiner—David J. Williamowski
Assistant Examiner—Philip C. Kannan
Attorney—Watts, Hoffmann, Fisher & Heinke ABSTRACT: A plurality of identical, reversible, rectangular display panels each has two cylindrical column members along one-half of the length of opposite sides, the panels being arranged side-by-side to form a display unit with the column members on one panel axially aligned with and pivotally attached to the column members of the two adjacent flanking panels by connector pins extending into the adjacent end sections of the members. Individual cylindrical extension members telescoped with the fixed frame members provide continuations of the column members along the other half of the panel edge of the end panels of the display unit. The panels forming the unit are supported vertically by tubular cylindrical legs having upright shanks received in the lower ends of the column members, and the support legs, column members and extension members appear as continuous panel supporting columns. The display panels are assembled and disassembled from their standards and with one another by telescoping slide joints.

INVENTOR
ERMOND G. COWAN
BY
*Watts, Hoffmann, Fisher & Heinke*
ATTORNEYS

Patented Aug. 3, 1971

INVENTOR
ERMOND G. COWAN
BY *Watts, Hoffmann, Fisher & Heinke*
ATTORNEYS 3,596,701

DISPLAY PANEL ASSEMBLY

BACKGROUND OF THE INVENTION

The present invention relates to display panels of the type which can be readily assembled into a unitary or multiple panel display arrangement in which the panel or panels may be supported upright by standards.

SUMMARY OF THE INVENTION

A principal object of the invention is the provision of a new and improved display panel structure which can be compactly stored and readily assembled by merely telescoping certain parts to provide either a single display panel or display units of any number of panels connected side-by-side and in numerous angular and spatial positions with respect to one another to form inexpensively fabricated, attractive and highly visual display units.

Another object of the invention is the provision of a new and improved display panel structure which presents the appearance of one or more display panels supported between upright columns extending upright between the panels and along the edges and from the bottom to the top.

More specifically, the invention contemplates the provision of a plurality of identically formed rectangular display panels which are reversible and each having cylindrical, tubular column members attached to opposite side edges and extending from the same end and along approximately half the length thereof, the panels being pivotally joined side edge to side edge by a column member on one panel being axially aligned end-to-end with a column member of an adjacent panel and retained aligned by a pinlike connecting member extending into the adjacent end sections of the aligned column members.

A further object of the invention is the provision of a new and improved display panel having a flanged border along opposite parallel sides and cylindrical, tubular column members open along one side and having inwardly facing groove formations offset outwardly from the radius of the tubular walls for slidably receiving the flanged borders, the panel having tubular column members secured to opposite sides and extending along approximately one-half the length of the side whereby the column member of a like panel can be axially aligned therewith when the panels are positioned side-by-side so that the aligned column members provide a continuous column between two adjacent panels, or an individual tubular member may be attached to each of the panel column members to form continuations thereof.

Other objects and advantages of the invention will be apparent from the following description of a preferred form thereof, reference being made to the accompanying drawings wherein.

FIGS. 1 to 4 and 8 to 11 of the drawings show several forms of display panel assemblies or units, all of which are assembled of a plurality of identical, relatively inexpensively manufactured components by merely telescoping certain connecting parts with one another. To facilitate understanding of the disclosure, all like components of the units are designated by letters and individual components and parts thereof are designated by Arabic numerals.

Figure 1:
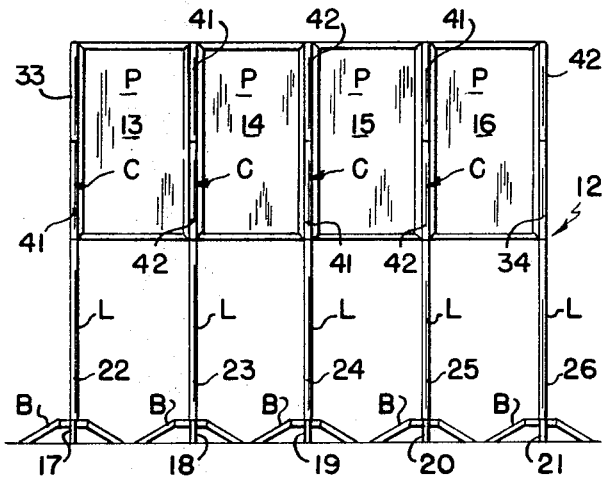
FIGS. 1, 2, 3 and 4 are front elevational views of our display panel units formed in accordance with the present invention.
Figure 5:
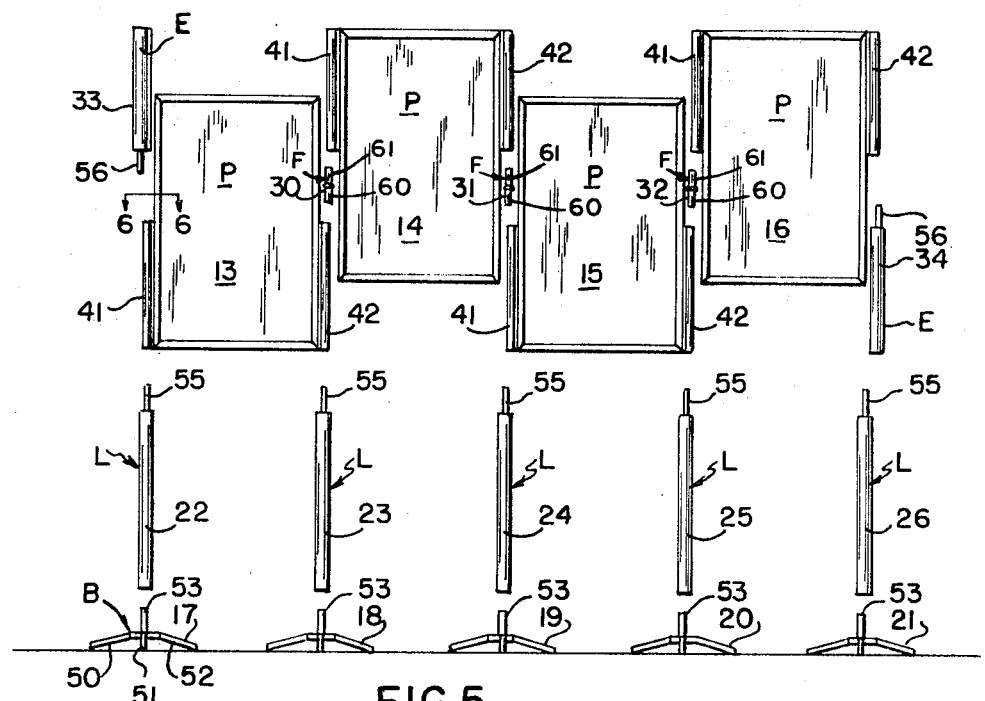
FIG. 5 is an exploded view of the display unit shown in FIG. 1.
Figure 7:
FIG. 7 is a side view of a connector member.

Referring to FIGS. 1 and 5, a display panel unit 12 is shown made up of four panels P supported in a straight line on five tripod standards. The standards each includes a tripod base B and an upright leg L supported on the base. The construction of the panel assembly is such that the legs L appear to be part of five unitary cylindrical columns C with the four panels P supported therebetween, as shown. The panels are interconnected by connector members F and the two outer side columns C include a column extension tube E.

The display unit 12 is assembled by components consisting of four like panels 13, 14, 15, 16; five tripod bases 17, 18, 19, 20, 21; five legs 22, 23, 24, 25, 26; three connector members 30, 31, 32 and two column extension members 33, 34.

Referring to the detail construction of the panels P, each panel comprises a relatively thin rectangular panel 35 which may be of any suitable material such as aluminum, plywood, pressed board or the like. The opposite faces of the panels preferably have the same character so that the panels can be reversed and present identical surfaces. Preferably, the panels have means to attach articles thereto for display. The panel 35 may be perforated, similarly to the well-known pegboard, or it may be covered with a plastic strand material presenting looped naps which are engaged by plastic barbs attached to the articles to be supported by the panel. Another form of surface for the panel 35 could be cork or slate.

Figure 6:
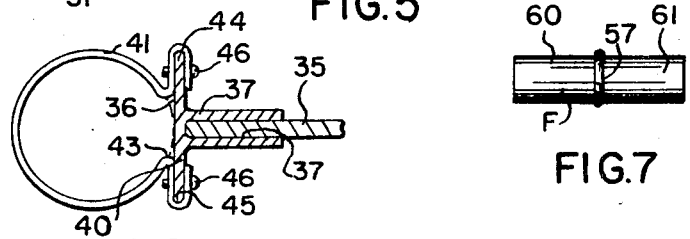
FIG. 6 is a sectional view taken along line 6—6 of FIG. 5.

The edge of the panel 35 has a flanged border comprising a strip 36 which is of generally T-shape in cross section, as seen in FIG. 6. The stem of the strip 36 has a groove, the walls 37 of which receive the edges of the panel 35. The strip 36 is suitably attached to the panel 35 as by rivets extended through the walls 37. The cross portion 40 of the strip provides flanges extending laterally from the plane of the panel 35.

Each of the panels P has two hollow cylindrical column members 41, 42 attached thereto. The length of the members 41, 42 are one-half the length of the panel 35 and the outer ends are flush with the flange 40 at one end of the panel. Preferably, the members 41, 42 are of extruded aluminum and are open along one edge at 43. The edge portions along each side of the opening 43 are reversely curved to form two grooves 44, 45 which receive the flange 40 of the border strips 36. The column members 41, 42 are attached to the panel flanges 36 by inserting the flanges into the grooves 44, 45 and sliding the column members in position on the panel. The members 41, 42 are then secured to the flanges 40 by rivets 46 extending through the walls 37 of the grooves and the flanges.

The members 41, 42 are formed so that a continuation of the cylindrical wall thereof over the opening 43 would be tangential to the outer faces of flanges 36. It is to be understood that each panel P has two of the column members 41, 42 attached to opposite sides thereof, and at one end. The open ends of the column members 41, 42 are adapted to receive other parts of the panel assembly, as is described hereinafter.

The standards for the panels P each include the base B which has three legs 50, 51, 52. The legs 50, 51, 52 are pivotally attached to brackets on one end of a tubular shank 53. The legs 50—52 can be swung from the shank 53 to facilitate storage of the base and are spread laterally from the shank to form a tripod support structure for the shank.

The diameter of the shank 53 is such that it can be telescoped inside a tubular leg to support the leg upright, or alternatively, it could be telescoped directly into either of column members 41, 42 of the panels P to support the panel upright. The tubular leg L has a shank portion 55 which is of the same outside diameter as the shank 53 and may likewise be telescoped into the ends of the column members 41, 42 of the panels P.

The column extension members E are each formed of an aluminum tube, cylindrical in form and having an outside diameter the same as that of the column members 41, 42. A shank 56 is formed on one end of the members E and, like shanks 55 of the leg L, is adapted to be telescoped into either of the members 41, 42. The larger diameter section of the connector members E may receive the shanks 55 of the legs L. Furthermore, the length of the extension members G, excluding the shank portion 56, is one-half the length of the panels P.

The connector members F each comprise a cylindrical, tubular member having a central collar 57 about the exterior thereof which is of the same diameter as that of the legs L and the members 41, 42. Shank sections 60 and 61 extend from opposite sides of the collar and are adapted to telescope into the ends of the members 41, 42.

Referring more particularly to FIG. 5, the manner in which the panels 13, 14, 15, 16 can be assembled to form the display unit 12 is clearly shown. The five bases 17—21 are positioned in a straight line along the floor and legs 22, 23, 24, 25, 26 are telescoped onto the base shanks 53. The panels 13 and 15 are then positioned with the column members 41, 42 thereof telescoped onto the shank sections 55 of the legs 22, 23 and 24, 25, respectively. The shanks 60 of the connector members 30 and 32 are inserted into the upper ends of the column member 41 of panels 13 and 15, respectively, and the shank 60 of the connector member 31 is inserted into the upper end of column member 41 of panel 15. The column extension tube 34 is telescoped onto the shank 55 of leg 26. The panel 14 is then positioned with the column members 41, 42 thereof at the upper end, which is accomplished by reversing the panel end-for-end relative to the positions of panels 13 and 15. The panel 14 is then manipulated so that the lower end of column members 41, 42 thereof are telescoped with the shanks 61 of connector members 30, 31. The panel 16 is reversed similarly to the panel 14 and is manipulated so that the end column member 41 is telescoped with the shank 61 of the connector member 32 and the column member 42 is telescoped with the shank 56 of the extension tube 34. The extension tube 33 is then attached to the column member 41 of the panel 13 by inserting the shank 56 thereof into the upper end of the column member.

By the construction described it will be seen that the panels P can be assembled with the standards merely by telescoping the various interfitting parts of the components comprising the assembly. It is also evident that any number of panels P can be used, depending upon the extent of the display desired.

Figure 2:
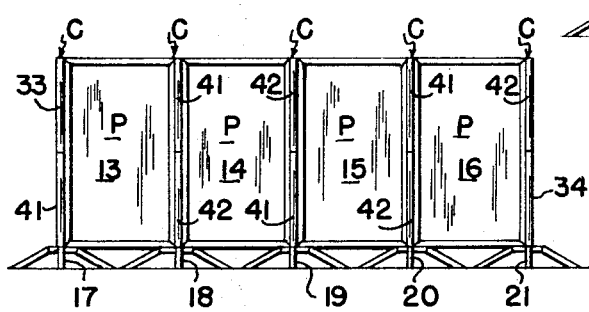

A low profile panel display assembly similar to the assembly 12 can be provided merely by omitting the legs L and supporting the panels P directly on the shanks 53 of the bases B, as seen in FIG. 2.

Figure 3:
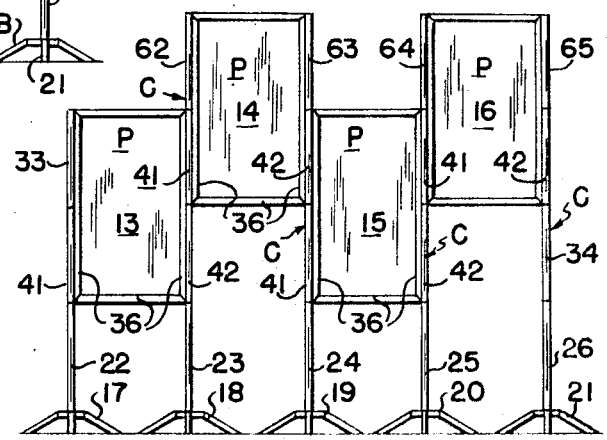

An interesting modification of the multiple panel display unit 12 can be achieved by assembling the panels P and the standards so that adjacent panels are at different elevations. Referring to FIG. 3, a display unit of this type is shown which is formed of the panels 13, 14, 15, 16 supported on the standard legs 22, 23, 24, 25, 26. The alternate elevations of the panels are achieved by positioning the panels 14 and 16 with the column members 41, 42 at their lower ends, as are those of the panels 13, 15. The column members 41, 42 of the panel 14 are connected with the column members 41, 42 of the panels 13, 15 respectively, by connector members F. The column member 41 of the panel 16 is connected with the column member 42 of the panel 15 by a connector C and the column member 42 of the panel 16 is telescoped with the shank 56 of the extension tube 34 which is in turn telescoped into the shank 55 of the leg 26. The column comprised of leg 22 is continued from the column member 41 of the panel 13 by the extension tube 33, as described with reference to the panel unit 12. The sides of the panels 14, 16 projecting above the tops of the panels 13, 15 are bounded by extension tubes 62, 63, 64, 65 the shanks 56 of which are telescoped into the respective upwardly facing end openings of the column members 41, 42 of the panels 14, 16.

The column extensions E are employed to provide the appearance of a continuous column along any exposed edges of a display panel P. As mentioned previously, the cylindrical walls of the column members 41, 42 are substantially tangential to the edge flanges 40 of the panels and the extensions E are of the same diameter. Thus, the columns C formed by the legs L, column members 41, 42 and the extensions E will appear tangential with the edge of the panels.

Figure 4:
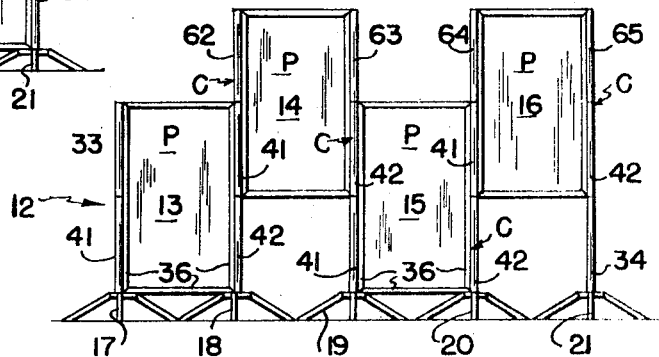

The elevation of the display panel shown in FIG. 3 can be lowered by omitting the standard legs L, as seen in FIG. 4. In this form of display unit, the panels 13, 15 are telescoped onto the shanks 53 of the bases 17, 18, 19, 20 and the right-hand side of the panel 16 is supported by the extension tube 34, which is telescoped onto the shank 53 of the right-hand base 21.

Figure 8:
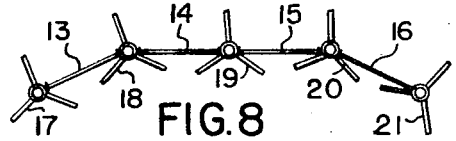
FIGS. 8, 9, 10 and 11 are top plane views of multiple panel display units formed by setting the individual panels at different angular relationships.
Figure 9:
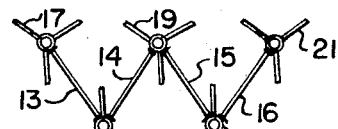
Figure 10:
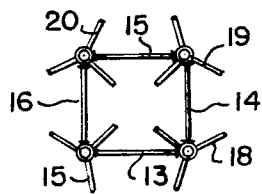

The connections between the panels P and standards effected by the telescoping shank portions 55 of the legs L, column members 41, 42, connector tubes F and column extensions E permit the panels to pivot or swing about the axes of the column members. Thus, various angular configurations between the panels of a display unit can be achieved. As examples, a unit is illustrated in FIG. 8 which is similar to the unit 12 except that the end panels 13, 16 are at slight angles to the plane of the panels 14, 15. FIG. 9 illustrates the same panel display unit with the panels arranged at acute angles with one another. FIG. 10 illustrated the panels arranged at 90° to one another. In this form, only four bases B are utilized. Where the panels 13—16 are at the same elevation, as in FIG. 1, column member 42 of the panel 16 is connected by a connector F with the column member 41 of the panel 13 to close the rectangular form of the display. In the event the alternate panels 13—16 are at different elevations, as in the case of the display unit in FIG. 2, the lower end of column member 42 of the panel 16 is connected with the upper end of the column member 41 of the panel 13.

Figure 11:
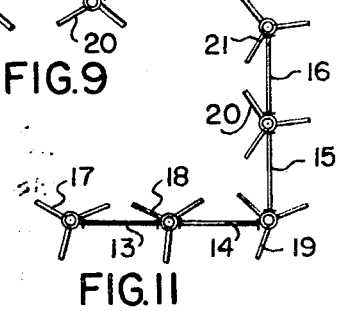

FIG. 11 illustrates a display unit in which two adjacent panels in one plane are at 90° to the plane of the other two panels.

It will be appreciated that the parts forming the panels and standards therefor can be inexpensively fabricated and that the panel assemblies can be quickly assembled and disassembled merely by telescoping of parts. Furthermore, many forms and elevations can be achieved merely by reversal of certain components and omission of certain components.

I claim:

1. A display panel comprising a panel member having two opposite upright parallel sides, and two column members attached thereto along said opposite sides, said column members each extending approximately from the same end and to approximately the midpoint of the respective sides of said panel member, said column members each having opposite ends formed to telescopingly receive portions of connecting parts.

2. A display panel as defined in claim 1 further characterized by said panels having laterally projecting flanges extending therefrom along said opposite sides and said column members each comprising a tubular member open along one side and having oppositely facing groove formations along opposite sides of said opening with said flanges along the respective sides of said panel received therein to secure said members to said panel.

3. A display panel as defined in claim 1 further characterized by a tubular member, the major portion thereof having an outside diameter equal to that of one of said column members and having a shank portion at one end of said major portion of reduced diameter received in one end of said one column member, the length of said major portion of said tubular member being approximately one-half the length of said panel.

4. A display panel as defined in claim 3 further characterized by said column member having said one end terminating at the midpoint of one of said sides of said panel, said tubular member extending from said midpoint to the other end of said panel.

5. A display panel as defined in claim 4 further characterized by a tubular support leg having a major portion thereof of the same outside diameter as said members and having and end shank portion of reduced diameter telescoped into one of said members.

6. A display panel as defined in claim 5 further characterized by said one member comprising said column member.

7. A display panel as defined in claim 1 further characterized by said column members having a cylindrical form.

8. A display panel as defined in claim 5 characterized by said members being of cylindrical form.

9. A display panel structure comprising in combination, a plurality of rectangular panel members, each of said members having two tubular column members attached thereto at opposite sides and extending from the same end of the panel member and along approximately one-half the length of the respective opposite sides, a column member of one panel being axially aligned with a column member of an adjacent panel member and having ends thereof adjacent one another, and a connector member interconnecting said axially aligned adjacent ends of said column members and operative to maintain the last mentioned column members aligned.